(12) United States Patent
Nishimura

(10) Patent No.: US 9,339,958 B2
(45) Date of Patent: May 17, 2016

(54) MOLD MOUNTING PLATEN FOR INJECTION MOLDING MACHINE

(71) Applicant: FANUC Corporation, Yamanashi (JP)

(72) Inventor: Naruhiro Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/533,554

(22) Filed: Nov. 5, 2014

(65) Prior Publication Data

US 2015/0125567 A1 May 7, 2015

(30) Foreign Application Priority Data

Nov. 6, 2013 (JP) .................................. 2013-230556

(51) Int. Cl.
*B29C 45/17* (2006.01)

(52) U.S. Cl.
CPC .................................. *B29C 45/1744* (2013.01)

(58) Field of Classification Search
CPC .................................................. B29C 45/1744
See application file for complete search history.

(56) References Cited

U.S. PATENT DOCUMENTS

| 5,776,402 | A | * | 7/1998 | Glaesener | B29C 45/1744 100/295 |
|---|---|---|---|---|---|
| 6,439,876 | B1 | * | 8/2002 | Glaesener | B29C 45/1744 100/295 |
| 7,491,051 | B2 | | 2/2009 | Matsushita et al. | |
| 2007/0222097 | A1 | | 9/2007 | Nishimura et al. | |

FOREIGN PATENT DOCUMENTS

| DE | 102 14 458 | * | 10/2003 |
|---|---|---|---|
| JP | 8-258103 A | | 10/1996 |
| JP | 11-170322 A | | 6/1999 |
| JP | 2007-253458 A | | 10/2007 |
| JP | 2008-100504 A | | 5/2008 |
| JP | 4364924 B2 | | 11/2009 |
| JP | 2010-111018 A | | 5/2010 |

OTHER PUBLICATIONS

Office Action mailed Feb. 17, 2015, corresponding to Japanese patent application No. 2013-230556.

* cited by examiner

*Primary Examiner* — James Mackey
(74) *Attorney, Agent, or Firm* — Hauptman Ham, LLP

(57) ABSTRACT

In a mold mounting platen for an injection molding machine, at least one of a mold mounting member and a clamping force transmission member constituting the mold mounting platen has a central bearing surface in a central portion thereof and a peripheral bearing surface outside the central bearing surface. The amount of protrusion of the central bearing surface is larger than that of the peripheral bearing surface.

2 Claims, 6 Drawing Sheets

CROSS SECTION
A-A

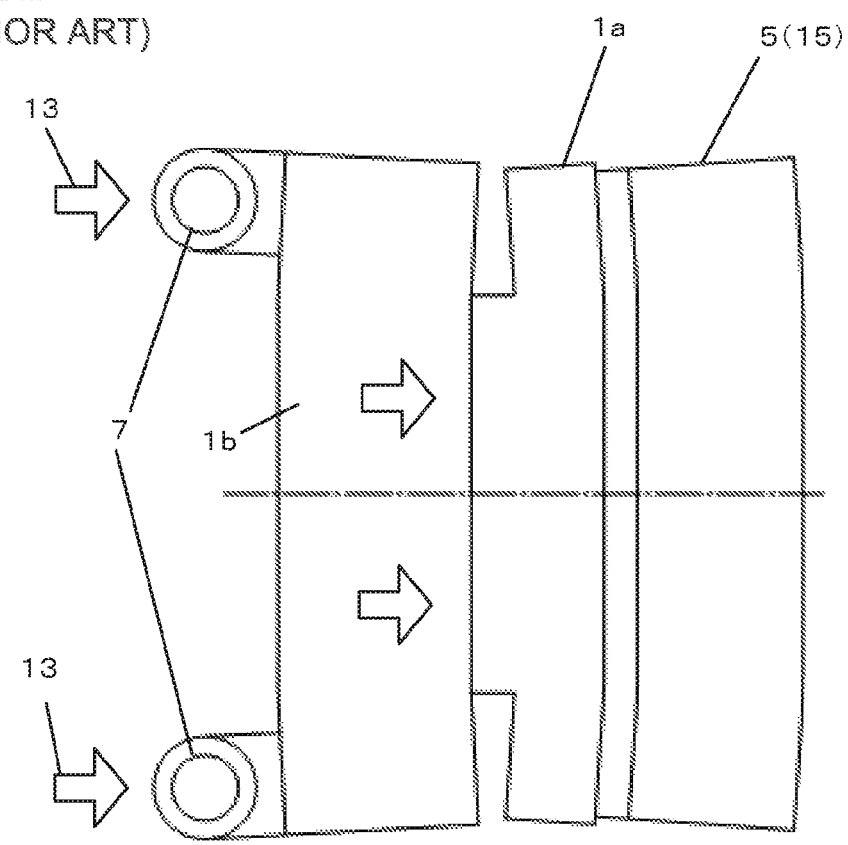

MOLD MOUNTING PLATEN FOR INJECTION MOLDING MACHINE

RELATED APPLICATIONS

The present application claims priority to Japanese Application Number 2013-230556, filed Nov. 6, 2013, the disclosure of which is hereby incorporated by reference herein in its entirety.

BACKGROUND OF THE INVENTION

1. Field of the Invention

The present invention relates to a mold mounting platen for use in an injection molding machine.

2. Description of the Related Art

An injection molding machine includes a movable platen which moves along several tie rods disposed perpendicularly to a stationary platen fixed to a base frame. Moreover, in a clamping mechanism of the injection molding machine, the movable platen and a rear platen are connected by a toggle mechanism. The extension of links of the toggle mechanism causes the tie rods to extend and generates clamping force.

FIG. 10 is a view showing a toggle clamping mechanism of a general prior art injection molding machine. Reference numeral 1 denotes a movable platen, and reference numeral 2 denotes a stationary platen. Moreover, reference numerals 3 denote tie rods. The movable platen 1 is configured to move along the tie rods 3 in the lateral direction in FIG. 10. The tie rods 3 are fixed to tie rod fixing portions 6 on a surface of the stationary platen 2 which is opposite from the movable platen 1 side.

A movable-side mold half 5 and a stationary-side mold half 4 are respectively provided on the movable platen 1 and the stationary platen 2 to face each other. Moreover, a toggle link mechanism 71 is provided on a side of the movable platen 1 which is opposite from the stationary platen 2. The toggle link mechanism 71 transmits the clamping force of the movable platen 1 side to the movable-side mold half 5.

As shown in FIG. 10, in the prior art injection molding machine, the tie rod fixing portions 6 to which the tie rods 3 are fixed are provided in four corner portions of the stationary platen 2, and toggle link supporting points 7 of the toggle link mechanism 71 are provided at two upper and lower outer positions on the movable platen 1. In the case where such a configuration is employed, the following problem may occur: the contact pressure at a junction surface 14 between the stationary-side mold half 4 and the movable-side mold half 5 increases with increasing distance from the center, and becomes low in a central region.

A number of techniques which have been developed to solve the above-described problem are disclosed in the patent documents below.

In a clamping mechanism for an injection molding machine disclosed in Japanese Patent Application Laid-Open No. H8-258103, square pyramid-shaped support mechanisms are used to support a stationary platen and a movable platen. Apex portions of the support mechanisms support the stationary platen and the movable platen so that clamping force may be generated in the central region.

In a mold clamping apparatus disclosed in Japanese Patent Application Laid-Open No. H11-170322, a groove for the prevention of distortion is provided between toggle link supporting points and a mold mounting surface to which a movable-side mold half is attached, so as to prevent distortion from occurring in the mold mounting surface.

Moreover, in a mold clamping apparatus for an injection molding machine disclosed in Japanese Patent Application Laid-Open No. 2007-253458, a detachable contact member is provided between each of a stationary platen, a movable platen and a peripheral portion of a corresponding clamping force transmission member. The contact member is attached or detached in accordance with the size of a mold to control the transmission of clamping force from the clamping force transmission members.

Further, in a mold clamping apparatus disclosed in Japanese Patent Application Laid-Open No. 2010-111018, extended portions are provided on the periphery of a mold mounting surface as contact pressure adjusting portions for reducing pressure differences occurring across a junction surface between a stationary-side mold half and a movable-side mold half.

In the clamping mechanism of the injection molding machine disclosed in Japanese Patent Application Laid-Open No. H8-258103 and the mold clamping apparatus disclosed in Japanese Patent Application Laid-Open No. H11-170322, a decrease in contact pressure in the central region can be reduced by pressing only in the central region or by providing a groove to inhibit the transmission of the clamping force in a peripheral region. Such configurations are suitable for cases where a mold is located only in the central region. However, in the case where a mold is vertically or horizontally long and reaches the outside of connecting portions of divided platens in Japanese Patent Application Laid-Open No. H8-258103 or a portion corresponding to the groove in Japanese Patent Application Laid-Open No. H11-170322, the transmission of the clamping force is weak in the peripheral region. Accordingly, dimensional errors or burrs may occur in molded parts (see FIG. 11).

In the mold clamping apparatus of the injection molding machine disclosed in Japanese Patent Application Laid-Open No. 2007-253458, the transmission of the clamping force to the peripheral region is controlled by attaching or detaching the contact members as clamping force transmission members. However, the contact members need to be provided as additional components. Accordingly, the complexity of the mechanism and the operation may increase as follows: mechanisms for attaching and detaching the contact members in accordance with mold size and the like need to be added; the contact members need to be attached or detached by hand operation; and the like.

In the mold clamping apparatus disclosed in Japanese Patent Application Laid-Open No. 2010-111018, bearing surfaces for connection are provided on the periphery. Thus, the mold clamping apparatus is suitable for vertically or horizontally long molds. However, the effect of concentrating the clamping force at the center is small. Accordingly, in the case where a mold is located only in a central portion, problems such as a decrease in the clamping force may occur.

SUMMARY OF THE INVENTION

Accordingly, an object of the present invention is to provide a mold mounting platen which is used in an injection molding machine to transmit optimal clamping force regardless of the size and shape of a mold.

The present invention provides a mold mounting platen for an injection molding machine. The mold mounting platen includes a mold mounting member and a clamping force transmission member. At least one of the mold mounting member and the clamping force transmission member includes a central bearing surface in a central portion thereof, a peripheral bearing surface provided outside the central bearing surface, and a recessed portion provided between the central bearing surface and the peripheral bearing surface. An amount of protrusion of the central bearing surface in a direction opposite to a direction of depth of the recessed portion and parallel to a mold opening/closing direction is larger than that of the peripheral bearing surface.

As described above, the central bearing surface is provided in the central portion of at least one of the mold mounting member and the clamping force transmission member; the peripheral bearing surface is provided outside the central bearing surface; the recessed portion is provided between the two bearing surfaces; and the amount of protrusion of the central bearing surface from the recessed portion is larger than that of the peripheral bearing surface. Accordingly, when the size of a mold is not so large and the mold is located only in a central region, the mold mounting member and the clamping force transmission member are connected to each other with the central bearing surface in contact. On the other hand, when a vertically or horizontally long mold is used, force applied to the mold causes the mold mounting member and the clamping force transmission member to be connected to each other with the peripheral bearing surface as well as the central bearing surface in contact, and therefore clamping force is transmitted even in a peripheral region. Thus, optimal clamping force can be provided regardless of the size and shape of a mold.

A difference between the amount of protrusion of the central bearing surface and that of the peripheral bearing surface may be larger than an amount by which the clamping force transmission member is deformed in the mold opening/closing direction at a surface facing the peripheral bearing surface at time of generation of rated clamping force.

In that case, since the difference between the amount of protrusion of the central bearing surface and that of the peripheral bearing surface is larger than the amount by which the clamping force transmission member is deformed in the mold opening/closing direction at the peripheral bearing surface at the time of generation of the rated clamping force, contact between the clamping force transmission member and the mold mounting member at the time of generation of rated clamping force is prevented from being made only by the deformation of the clamping force transmission member.

With the above-described configuration, the present invention can provide a mold mounting platen which is used in an injection molding machine to transmit optimal clamping force regardless of the size and shape of a mold.

BRIEF DESCRIPTION OF THE DRAWINGS

These and other objects and features of the present invention will become apparent from the following description of exemplary embodiments with reference to the accompanying drawings in which:

FIG. 11 is a view showing the deformation of a movable platen in the prior art technique.

DETAILED DESCRIPTION OF THE PREFERRED EMBODIMENTS

Figure 1:
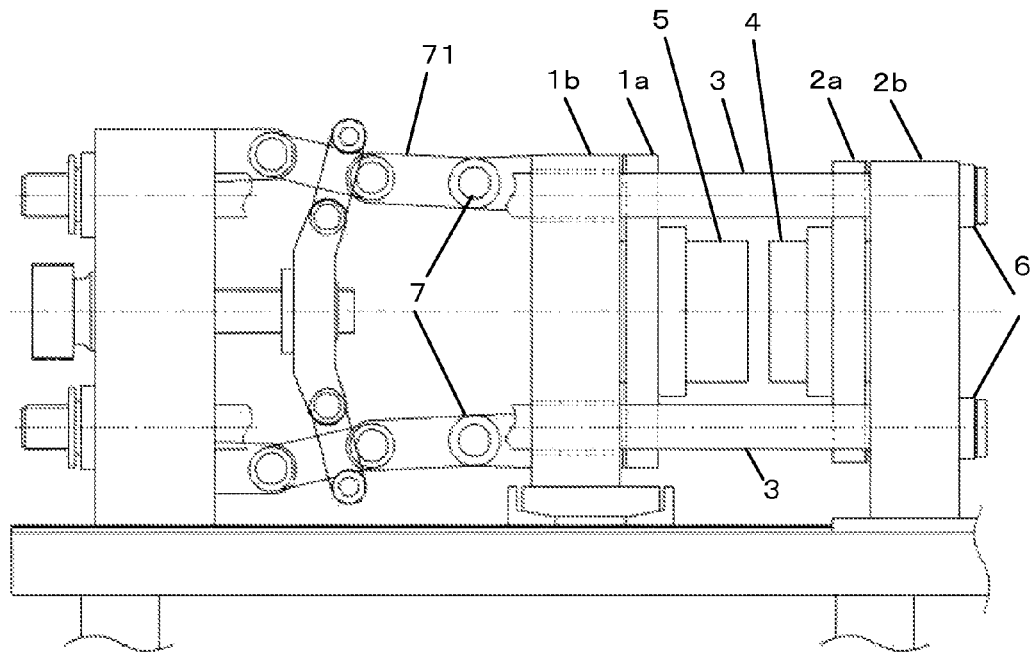
FIG. 1 is a view showing a toggle clamping mechanism for an injection molding machine in one embodiment of the present invention.

FIG. 1 is a view showing a toggle clamping mechanism for an injection molding machine of one embodiment of the present invention. Reference numeral 1 denotes a movable platen, and reference numeral 2 denotes a stationary platen. Moreover, reference numerals 3 denote tie rods. The movable platen 1 is configured to move along the tie rods 3 in the lateral direction in FIG. 1. The tie rods 3 are fixed to tie rod fixing portions 6 on a surface of the stationary platen 2 which is opposite from the movable platen 1.

A movable-side mold half 5 and a stationary-side mold half 4 are respectively provided on the movable platen 1 and the stationary platen 2 to face each other. Moreover, a toggle link mechanism 71 is provided on a side of the movable platen 1 which is opposite from the stationary platen 2. The toggle link mechanism 71 transmits the clamping force of the movable platen 1 side to the movable-side mold half 5.

In the toggle clamping mechanism of the injection molding machine of this embodiment, each of the movable platen 1 and the stationary platen 2 is divided into a mold mounting member and a clamping force transmission member. Specifically, the movable platen 1 is divided into a movable-side mold half mounting member 1a and a movable-side clamping force transmission member 1b, and the stationary platen 2 is divided into a stationary-side mold half mounting member 2a and a stationary-side clamping force transmission member 2b.

Figure 2:
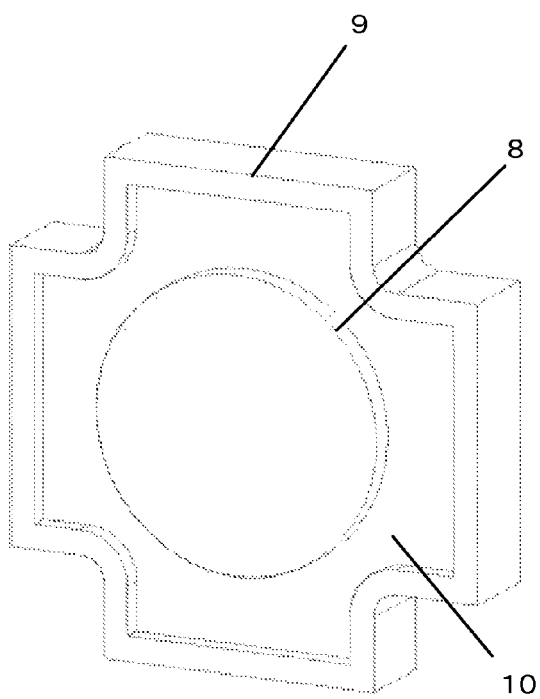
FIG. 2 is a perspective view of a mold mounting member.
Figure 3A:
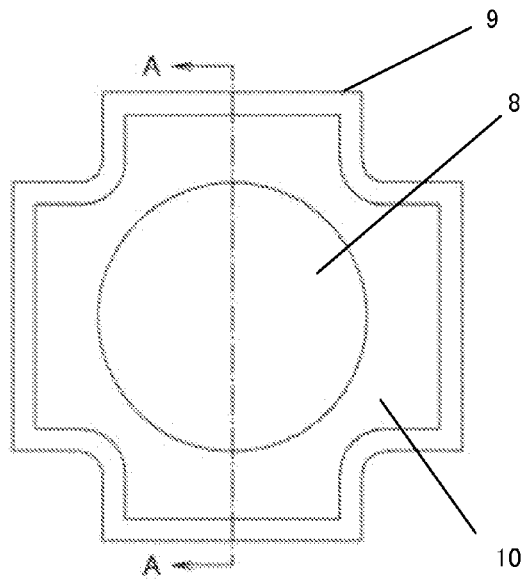
FIG. 3A is a front view of the mold mounting member.
Figure 3B:
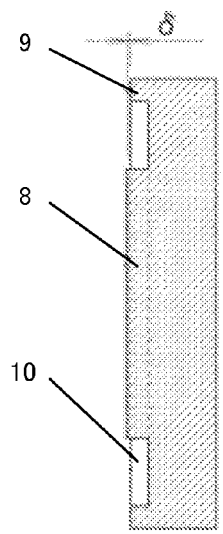
FIG. 3B is a cross-sectional view of the mold mounting member taken along line A-A of FIG. 3A.

FIGS. 2, 3A, 3B are views showing the movable-side mold half mounting member 1a. FIG. 2 is a perspective view of the movable-side mold half mounting member 1a, FIG. 3A is a front view thereof, and FIG. 3B is a cross-sectional view thereof taken along line A-A of FIG. 3A. As shown in FIGS. 2, 3A, 3B, a central bearing surface 8 is provided in a central portion of a surface of the movable-side mold half mounting member 1a opposite from a surface thereof to which the movable-side mold half 5 is attached, and a peripheral bearing surface 9 is provided in a peripheral portion thereof to surround the central bearing surface 8. Moreover, a recessed portion 10 is provided between the central bearing surface 8 and the peripheral bearing surface 9.

In this embodiment, the central bearing surface 8 and the peripheral bearing surface 9 are formed integrally with the movable-side mold half mounting member 1a as one component. However, the central bearing surface 8 and the peripheral bearing surface 9 may be formed as separate components and attached to the movable-side mold half mounting member 1a. Moreover, as shown in the cross-sectional view of FIG. 3B, the cross-sectional shape of the recessed portion 10 is a rectangular shape in this embodiment, but not limited to this shape, and may be other shape, for example, a shape having a curved bottom portion such as a spherical bottom portion.

As shown in the cross-sectional view of FIG. 3B, both of the central bearing surface 8 and the peripheral bearing surface 9 protrude in a direction opposite to the direction of depth of the recessed portion 10, i.e., in a direction opposite from the surface of the movable-side mold half mounting member 1a to which the movable-side mold half 5 is attached. The amount of protrusion of the central bearing surface 8 is larger than the amount of protrusion of the peripheral bearing surface 9 by δ. With a clearance having a height of δ, when the movable-side mold half mounting member 1a is attached to the movable-side clamping force transmission member 1b, the central bearing surface 8 of the movable-side mold half mounting member 1a comes in contact with the movable-side clamping force transmission member 1b. The size of δ may be appropriately set in accordance with the rigidity of the movable-side mold half mounting member 1a and the movable-side clamping force transmission member 1b, and is preferably approximately 0.2 to 2 mm.

Figure 4:
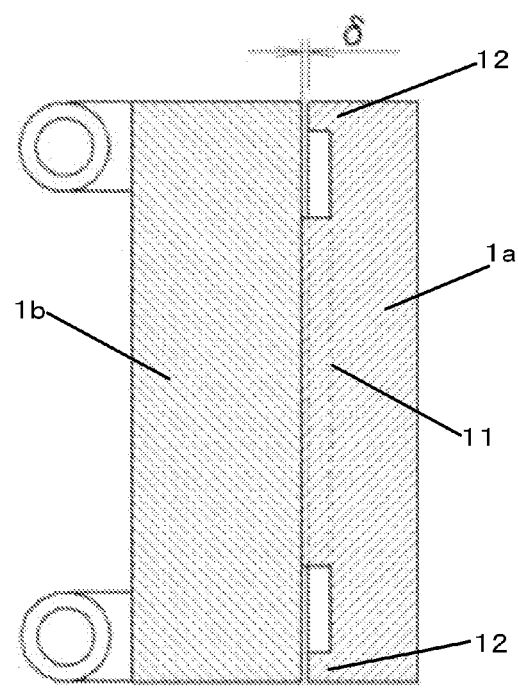
FIG. 4 is a cross-sectional view showing a state in which the mold mounting member and a clamping force transmission member are in contact with each other with no clamping force generated.

FIG. 4 is a cross-sectional view showing the movable-side mold half mounting member 1a and the movable-side clamping force transmission member 1b attached to the foregoing. When clamping force is not generated, as shown in FIG. 4, a portion (connecting portion 11) of the central bearing surface 8 of the movable-side mold half mounting member 1a is in contact with the movable-side clamping force transmission member 1b, and a portion (non-connecting portion 12) of the peripheral bearing surface 9 of the movable-side mold half mounting member 1a has a clearance of δ to the movable-side clamping force transmission member 1b. The size of δ is set so as to be larger than the amount of deformation caused in the movable-side clamping force transmission member 1b when rated clamping force specified for the injection molding machine is generated.

Figure 5:
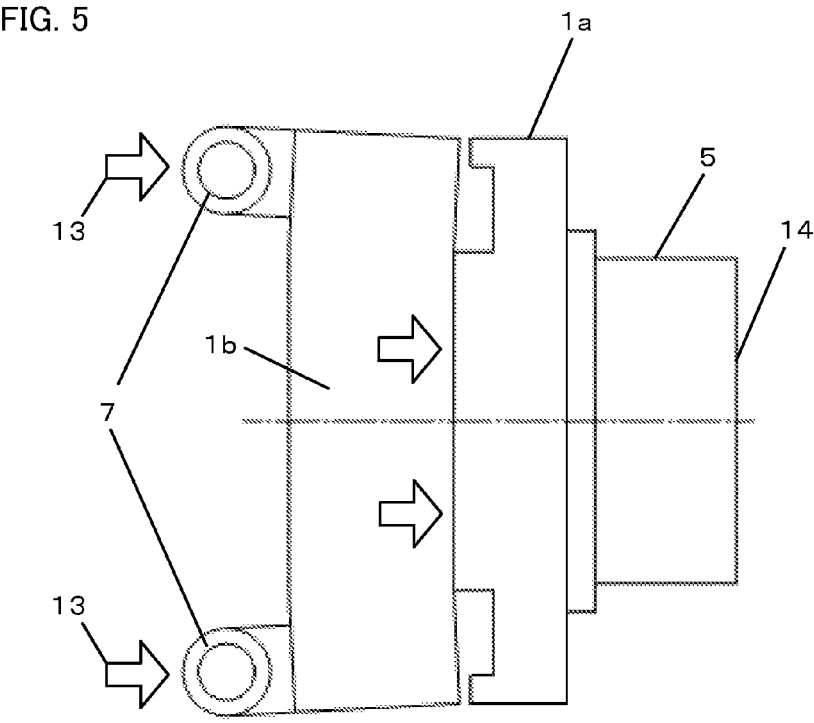
FIG. 5 is a view showing the deformation caused in a platen when a general mold in which molded parts are located in a central region is used.

Next, the operation of the injection molding machine of this embodiment will be described with reference to FIGS. 5 and 6. FIG. 5 shows the case of a general mold in which molded parts are located in a central region, and FIG. 6 shows the case where a vertically long mold is used.

In the case of a general mold in which molded parts are located in the central region as shown in FIG. 5, the mold is not located in a peripheral region. Accordingly, the clamping force 13 from the toggle link mechanism 71 is transmitted only through the central bearing surface 8 at the center, and is not transmitted through the peripheral bearing surface 9 on the periphery. Thus, the clamping force can be concentrated on the central region in the vicinity of the molded parts.

Figure 6:
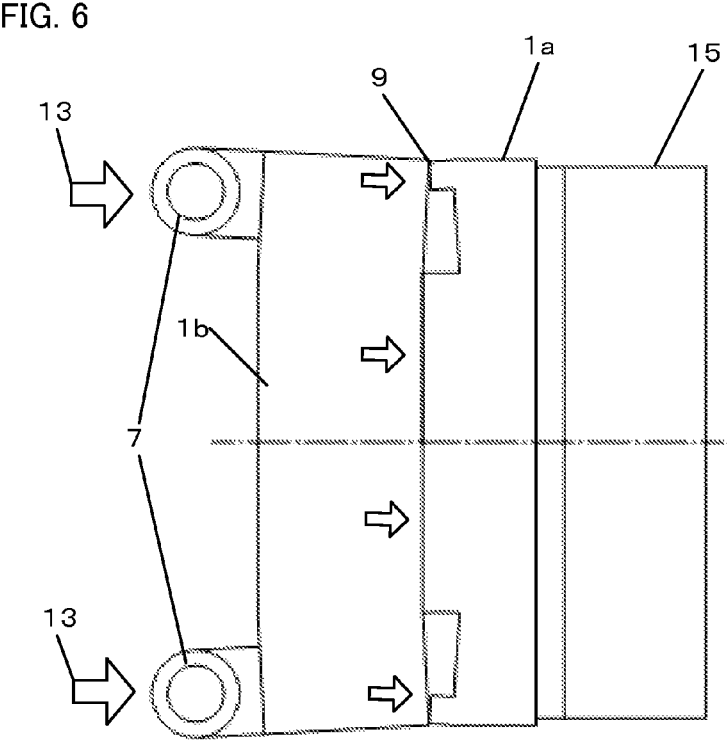
FIG. 6 is a view showing the deformation caused in the platen when a vertically long mold is used.

On the other hand, in the case where a vertically or horizontally long mold is used as shown in FIG. 6, the mold is partially located in the peripheral region. Accordingly, the clamping force 13 from the toggle link mechanism 71 can be transmitted even in the peripheral region. Specifically, as shown in FIG. 6, a peripheral portion of the mold mounting platen outside the connecting portion deforms to come in contact with the peripheral bearing surface 9. Thus, the clamping force is also transmitted to regions around the molded parts located at outer positions. It should be noted that reference numeral 15 denotes the movable-side mold half.

As described above, the state of contact of the peripheral bearing surface 9 changes in accordance with the size and shape of a mold to be used, and a contact pressure distribution appropriate for the mold can be realized. Thus, defective molding such as the occurrence of burrs can be reduced in any type of mold.

Figure 7:
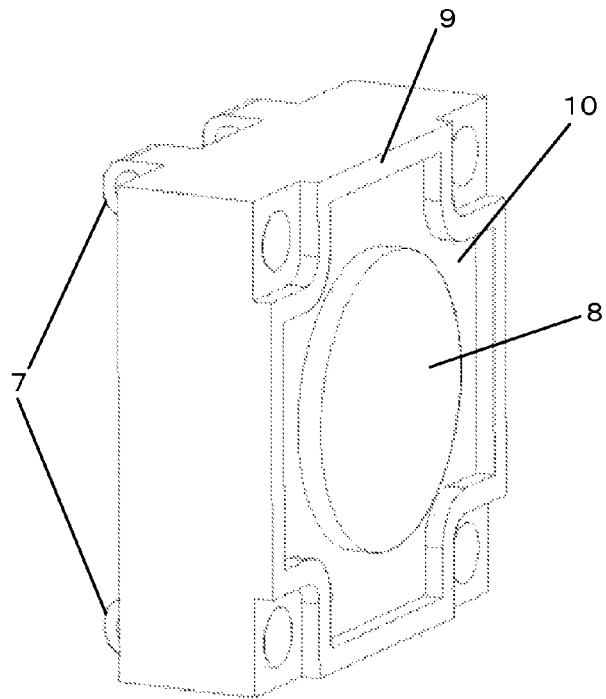
FIG. 7 is a view showing a central bearing surface and a peripheral bearing surface provided in the clamping force transmission member.
Figure 8:
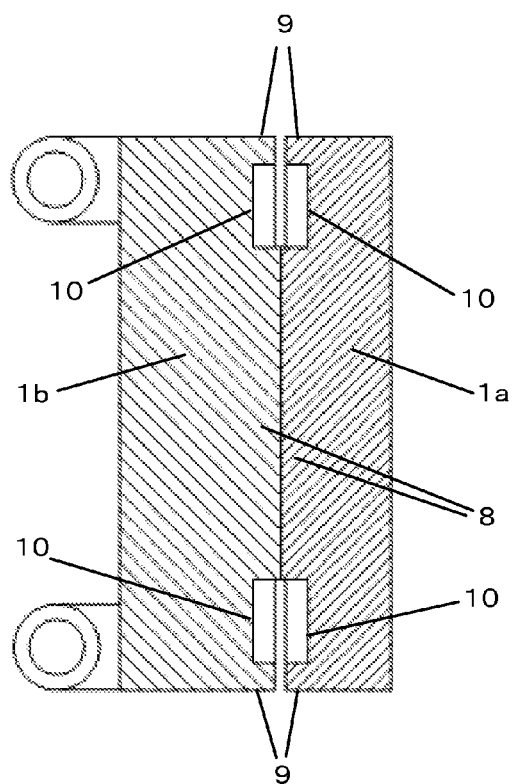
FIG. 8 is a cross-sectional view showing a state in which a mold mounting member and a clamping force transmission member, each having a central bearing surface and a peripheral bearing surface, are in contact with each other.

In the above description, an explanation has been made using an example in which the central bearing surface 8 and the peripheral bearing surface 9 are provided on the movable-side mold half mounting member 1a of the movable platen 1. However, the central bearing surface 8 and the peripheral bearing surface 9 may be provided on the movable-side clamping force transmission member 1b as shown in FIG. 7. Moreover, the central bearing surface 8 and the peripheral bearing surface 9 may also be provided on each of the movable-side mold half mounting member 1a and the movable-side clamping force transmission member 1b. FIG. 8 is a cross-sectional view for the case where the central bearing surface 8 and the peripheral bearing surface 9 are provided on each of the movable-side mold half mounting member 1a and the movable-side clamping force transmission member 1b, showing a state in which the movable-side mold half mounting member 1a and the movable-side clamping force transmission member 1b are in contact with each other. In that case, also, as in the cases where the central bearing surface 8 and the peripheral bearing surface 9 are provided only on the movable-side mold half mounting member 1a as shown in FIGS. 5 and 6, the state of contact of the peripheral bearing surface 9 changes in accordance with the size of a mold, and a contact pressure distribution appropriate for the mold can be realized. Thus, defective molding such as the occurrence of burrs can be reduced in any type of mold.

Moreover, in this embodiment, an explanation has been made using an example in which the central bearing surface 8 and the peripheral bearing surface 9 are provided on the movable-side mold half mounting member 1a and the movable-side clamping force transmission member 1b of the movable platen 1. However, the central bearing surface 8 and the peripheral bearing surface 9 may also be provided on the stationary-side mold half mounting member 2a and the stationary-side clamping force transmission member 2b of the stationary platen 2 instead of the movable platen 1, or the central bearing surface 8 and the peripheral bearing surface 9 may also be provided on the mold mounting member and the clamping force transmission member of each of the movable platen 1 and the stationary platen 2.

Figure 9:
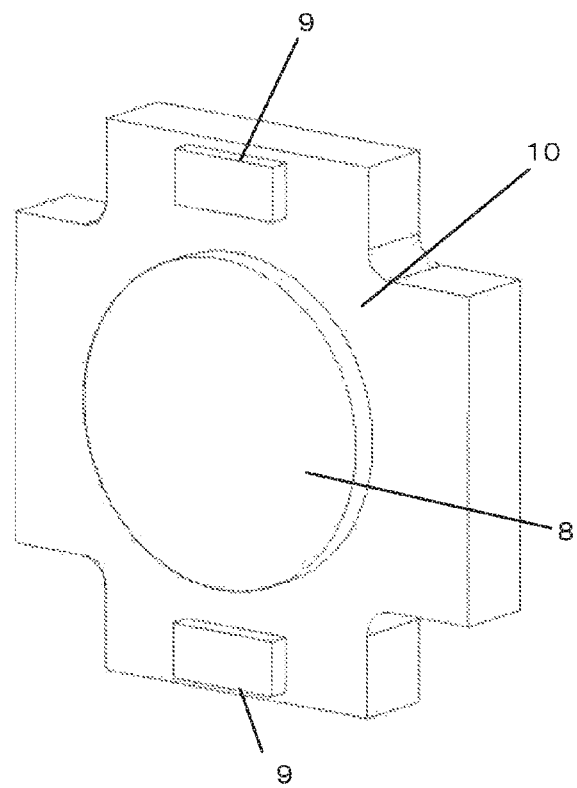
FIG. 9 is a view showing a modified example of the peripheral bearing surface.
Figure 10:
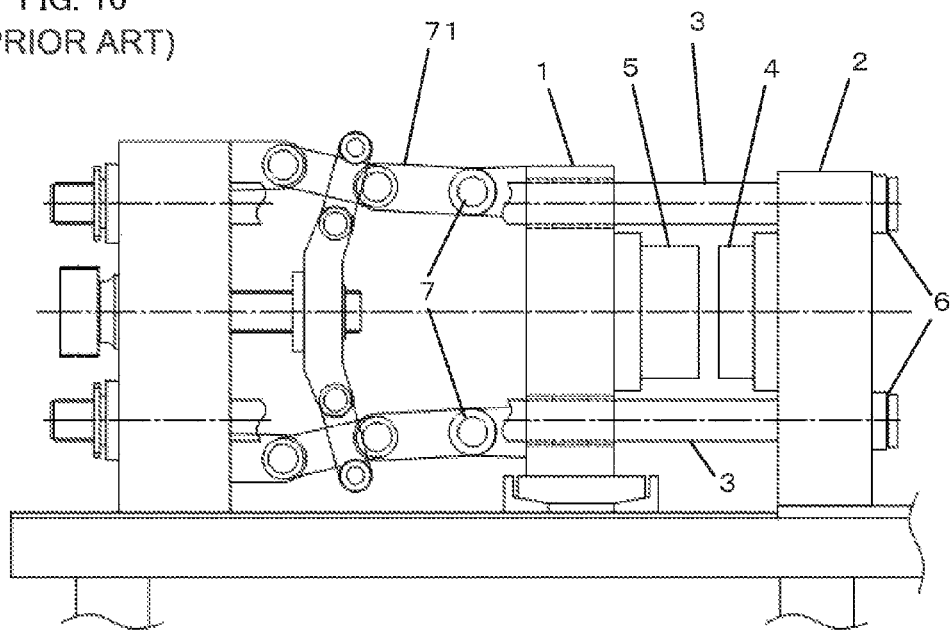
FIG. 10 is a view showing a toggle clamping mechanism of a prior art injection molding machine.

In this embodiment, an explanation has been made using an example having a configuration in which the peripheral bearing surface 9 surrounds the perimeter of the central bearing surface 8. However, the peripheral bearing surface 9 does not necessarily have to surround the entire perimeter of the central bearing surface 8, and may be appropriately modified as needed. In one example, as shown in FIG. 9, peripheral bearing surfaces 9 may be provided which are located only at upper and lower positions.

The invention claimed is:

1. A mold mounting platen for an injection molding machine, the mold mounting platen comprising:
 a mold mounting member; and
 a clamping force transmission member;
 wherein
 at least one of the mold mounting member and the clamping force transmission member comprises:
  a central bearing surface in a central portion of said at least one of the mold mounting member and the clamping force transmission member;
  a peripheral bearing surface surrounding the central bearing surface; and
  a recessed portion provided between the central bearing surface and the peripheral bearing surface, and
 an amount of protrusion of the central bearing surface in a direction opposite to a direction of depth of the recessed portion and parallel to a mold opening/closing direction is larger than that of the peripheral bearing surface.

2. The mold mounting platen according to claim 1, wherein the central bearing surface, the peripheral bearing surface and the recessed portion are provided on the mold mounting member, the clamping force transmission member has a surface facing the peripheral bearing surface, and a difference between the amount of protrusion of the central bearing surface and that of the peripheral bearing surface is larger than an amount by which the clamping force transmission member is deformed in the mold opening/closing direction at the surface facing the peripheral bearing surface at time of generation of rated clamping force.

* * * * *